April 30, 1963 R. B. NEUBERGER 3,087,722
PRESS FEEDING MECHANISM
Filed Aug. 18, 1960 4 Sheets-Sheet 1

INVENTOR.
ROGER BRUNO NEUBERGER
BY
George P. Ziehmer Jr.
AGENT

INVENTOR.
ROGER BRUNO NEUBERGER
BY
AGENT

April 30, 1963  R. B. NEUBERGER  3,087,722
PRESS FEEDING MECHANISM
Filed Aug. 18, 1960  4 Sheets-Sheet 3

INVENTOR.
ROGER BRUNO NEUBERGER
BY
George P. Ziehmer Jr.
AGENT

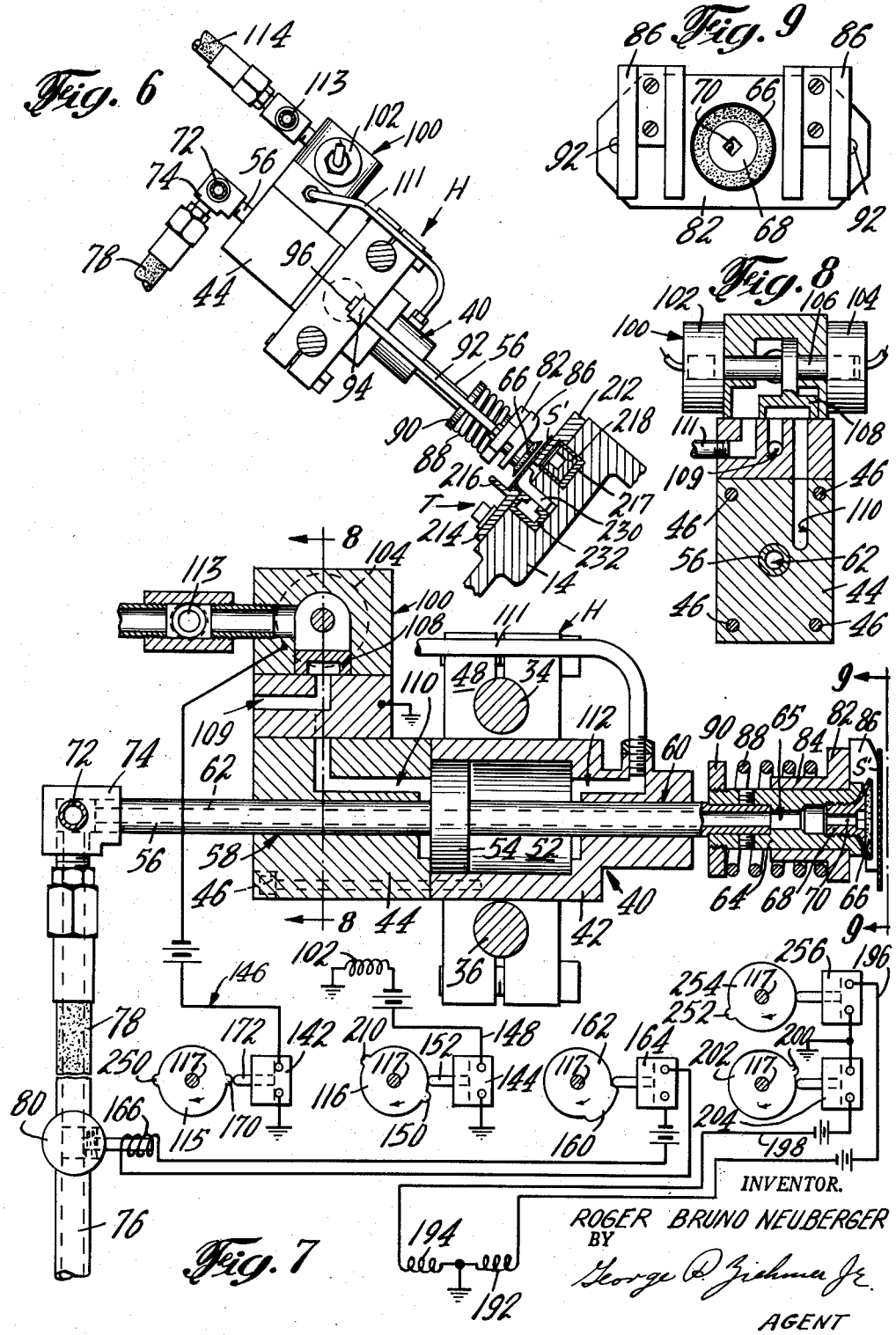

United States Patent Office 3,087,722
Patented Apr. 30, 1963

3,087,722
PRESS FEEDING MECHANISM
Roger Bruno Neuberger, Millbrae, Calif., assignor to American Can Company, New York, N.Y., a corporation of New Jersey
Filed Aug. 18, 1960, Ser. No. 50,344
8 Claims. (Cl. 271—26)

The present invention relates to strip feed presses and has particular reference to a rocker mechanism for transferring the strips from the press magazine to the press feed table.

In the usual strip feed press, the strips are lifted individually from the press magazine by a plurality of suction cups which operate at right angles to the surface of the strips, and are then released by the suction cups and engaged by feed arms which operate at right angles to the direction of movement of the suction cups and engage the trailing edges of the strips to feed them laterally across the surface of the press feed table and into position thereon preparatory to their being fed into the working station of the press.

Such devices work quite satisfactorily when used in conjunction with comparatively wide, sturdy strips. However, when narrow, flimsy strips are being run, it is desirable to avoid a transfer mechanism wherein the strips must be released by one device and then picked up by another during this transfer cycle, since in such devices it is difficult to maintain the strips under positive control at all times due to their tendency to buckle and flutter.

The present invention provides an apparatus which maintains complete control over such narrow strips during the transfer cycle. Such apparatus comprises a pivotally mounted transfer mechanism which is initially positioned in alignment with the press magazine and is provided with a plurality of suction cups which are engageable against the innermost strip in the press magazine to pull it from the magazine and into engagement with permanent magnets which are carried by the transfer mechanism adjacent the suction cups. The transfer mechanism is then rocked by a pneumatic cylinder from its initial position to a position wherein the strip is disposed in closely spaced relationship over the press feed table. During this transfer, the vacuum in the suction cups is cut off and the strip is held solely by the magnets. At the end of the transfer stroke, the suction cups are moved forwardly relative to the magnets to strip the strip mechanically from the magnets and push it against the feed table. Thereafter, the strip is fed along the feed table to the forming dies in the usual manner.

As a result of the provision of both suction cups and magnets on the transfer mechanism, the suction cups may be devacuumized at any time during the transfer stroke of the mechanism, once the strip has been brought into contact with the magnets, and may be vacuumized at any time during the return stroke of the mechanism preparatory to the picking up of the next strip. Thus, the timing of the vacuum cycle in the suction cups is not critical, and the normally encountered variations caused by wear and tear of the timing cams and valves have no effect on the operation of the transfer mechanism, with the result that there is substantially no danger of having the strips released from the transfer mechanism prematurely or being held thereon for too long a period because of mistiming of the vacuum cycle, either of which conditions could cause a wreck in the machine.

An object of the invention therefore is the provision of a strip feeding mechanism of simple construction which is completely reliable in operation.

Another object is the provision of a strip transfer mechanism which uses both magnetic and vacuum devices to control the strip, the vacuum devices being used to pick up the strips from the magazine in order to insure against the picking up of more than one strip at a time, as might happen if magnetic devices were used to pick up the strips, and the magnetic devices being used to control the strip during its transfer to the press feed table in order to eliminate a critical vacuum release cycle.

Numerous other objects and advantages of the invention will be apparent as it is better understood from the following description, which, taken in connection with the accompanying drawings, discloses a preferred embodiment thereof.

Referring now to the drawings:

FIG. 6 is a sectional view of a portion of the transfer mechanism shown in FIG. 2, the view showing the rocker head in alignment with the feed table immediately after a strip has been mechanically stripped from its holding magnets and pushed onto the feed table by the devacuumized suction cups;

Figure 1:
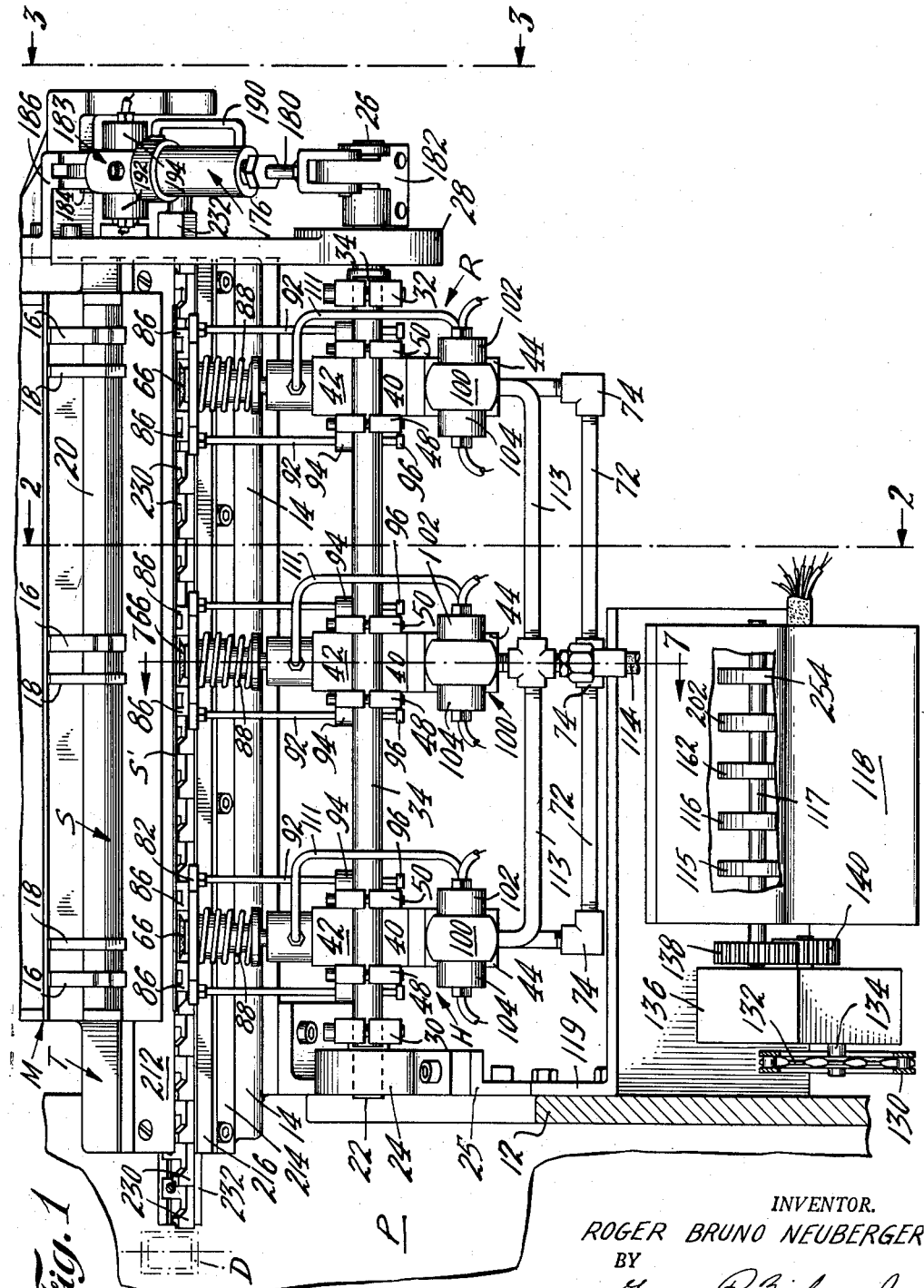
FIGURE 1 is a plan view of a transfer mechanism embodying the principles of the instant invention.

FIG. 7 is a sectional view on an enlarged scale taken through one of the suction cup units of the transfer mechanism, the view being taken substantially along the line 7—7 of FIG. 1 and also including a schematic showing of the various electrical, pneumatic and vacuum controls for the transfer mechanism; and FIGS. 8 and 9 are sections taken substantially along the lines 8—8 and 9—9, respectively of FIG. 7.

As a preferred and exemplary embodiment of the instant invention, the drawings illustrate the principal parts of a strip transfer mechanism wherein long narrow strips S of magnetizable material such as tinplate or the like are fed individually from a magazine M to a feed table T and then longitudinally along the feed table T to the forming die D of a press P (see FIGS. 1 and 2) which forms them into individual articles such as can ends or fittings. The press P comprises a stationary base 10 on which is pivotally mounted an inclinable frame 12 which carries the die D and has bolted to it a laterally extending frame 14 which forms the main frame of the strip transfer mechanism of the instant invention, and carries the feed table T and magazine M. The strips S in the magazine M are maintained in upright position therein by a plurality of cooperating spring guides 16 and spring clips 18, the inner strips in the magazine M being supported on a support plate 20 which is fastened to the magazine M in any suitable manner.

In order to feed the strips S from the magazine M, a rocker unit, generally designated by the letter R, is provided. The end of this rocker unit R adjacent the press P is mounted for pivotal movement on a short stub shaft 22 which is journaled in a bearing 24 secured to a plate 25 which is bolted to the press frame 12. The other end of the rocker unit R is mounted on a somewhat longer stub shaft 26 which is journaled in a bearing 28 which is secured to the frame 14.

The stub shafts 22, 26 are keyed to clamp brackets 30, 32 respectively and these clamp brackets are connected to each other by means of a pair of rods 34, 36 which carry a plurality (here shown as three) of transfer heads, each designated by the letter H, which operate in unison to remove the strips S individually and successively from the magazine M and transfer them to and deposit them on the feed table T.

Each transfer head H includes a pneumatic cylinder 40 which is composed of a pair of blocks 42, 44 (see FIG. 7) held in tight face to face engagement by four long bolts 46, and is secured to the rods 34, 36 by a pair of clamps 48, 50 which are secured to opposite sides of the block 42. Each block 42 is formed with an internal bore 52 in which is mounted a piston 54 which is secured to a sliding, double ended piston rod 56 which operates in bores 58, 60 formed respectively in the blocks 44, 42.

The piston rod 56 is hollow, being formed with a longitudinal bore 62, and at its forward end carries a suction cup holder 64 which is formed with an internal bore 65, a rubber suction cup 66 being clamped to the forward end of the holder 64 by means of a threaded plug 68 which is provided with an internal bore 70 which brings the suction cup 66 into communication with the respective bores 62 and 65 of the piston rod 56 and suction cup holder 64.

Figure 2:
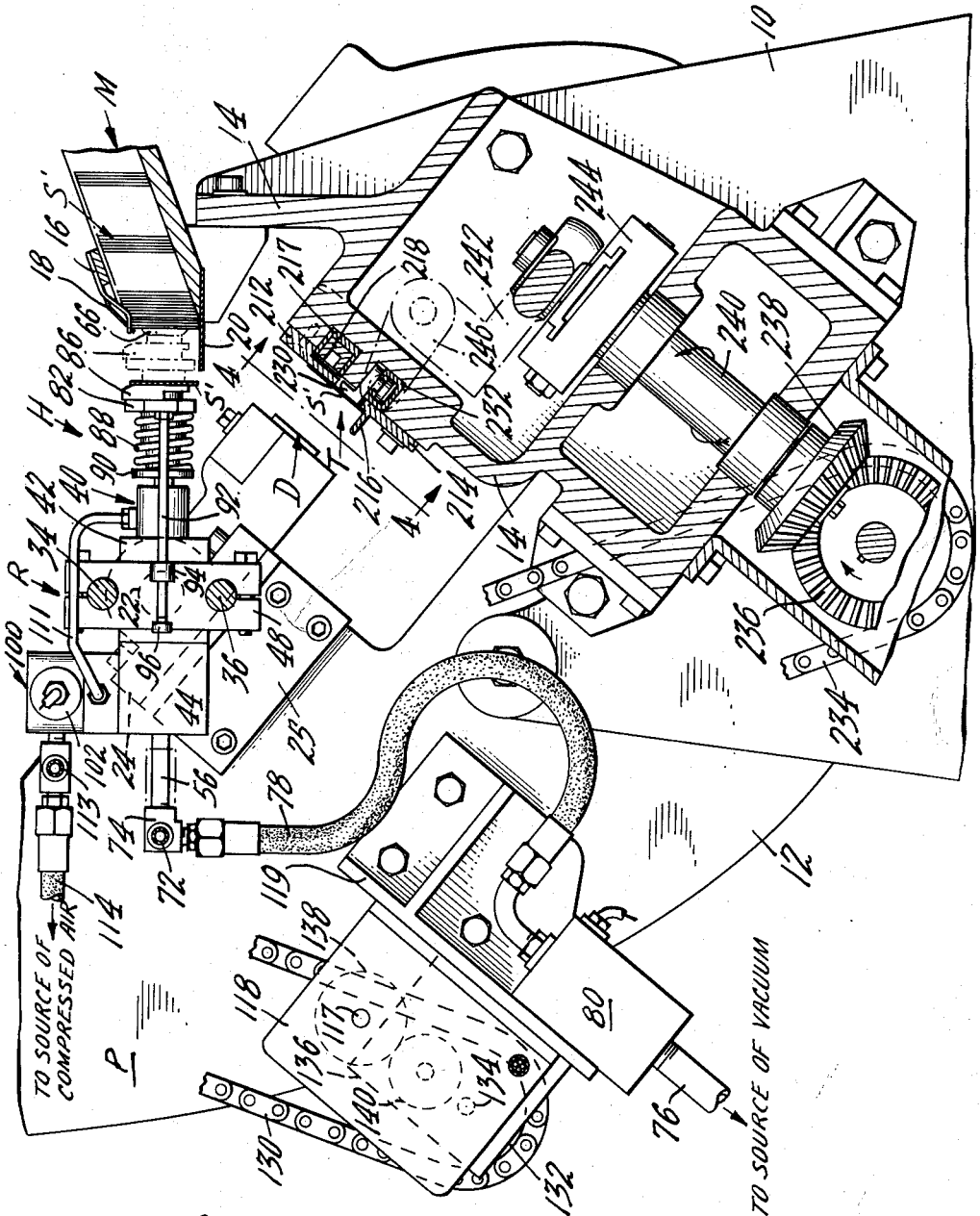
FIG. 2 is a vertical section taken substantially along the line 2—2 in FIG. 1.

At its rearward end, each rod 56 is connected to a vacuum manifold 72 by a coupling 74, the manifold 72 in turn being connected to a suitable vacuum line 76 through a flexible tube 78 (see FIG. 2). A conventional solenoid operated vacuum valve 80 (see FIGS. 2 and 7) is incorporated in the vacuum line 76 in order to control the vacuum cycle in the suction cups 66 in a manner which will hereinafter be described. The vacuum valve 80 is provided with a vent port (not shown) which vents the vacuum from the suction cups 66 when the valve cuts off the vacuum in the vacuum manifold 72.

Each suction cup holder 64 also carries on its forward end a magnet support plate 82 (see FIGS. 7 and 9) which is formed with a slide collar 84. Each plate 82 has secured to its forward end a pair of elongated horseshoe magnets 86 (see FIGS. 7 and 9) which straddle and normally project slightly beyond the suction cup 66 as best seen in FIG. 7. The magnets 86 are normally held in this forward position by an expansion spring 88 which is interposed between the plate 82 and a ring 90 which is threadedly secured to the inner end of the suction cup holder 64.

The plate 82 is held against rotation relative to the suction cup holder 64 by a pair of rods 92, the forward end of each rod 92 being secured in the plate 82 and the opposite end being slidably mounted in a boss 94 which is formed integral with the clamps 48, 50, the inner end of each rod 92 being formed with an enlarged head 96 which engages against the boss 94 and limits the forward movement of the plate 82 and consequently of the magnets 86.

The block 44 of each pneumatic cylinder 40 has secured to it a pneumatic valve 100 (see FIG. 7) which is actuated by a pair of solenoids 102, 104 which are provided with a common armature 106 which carries the valve slide 108. Each valve 100 is provided with a vent port 109, and internal bore 110 which leads to the inner side of the piston 54, and a pipe 111 which connects with a bore 112 which communicates with the outer side of the piston 54.

Each valve 100 is also connected to a compressed air manifold 113 (see FIG. 1) which in turn is connected to a source of compressed air (not shown) through a flexible hose 114, the compressed air in the manifold 113 being admitted selectively to one side or the other of the piston 54 by virtue of the position of the valve slide 108, which is controlled by the solenoids 102, 104. The solenoids in turn are controlled by a pair of rotary cams 115, 116 which are mounted on a cam shaft 117 which is mounted in a housing 118 secured to a bracket 119 bolted to the machine frame 12, as best seen in FIG. 1.

The cam shaft 117 is rotated in time with the other moving parts of the press from the main drive shaft of the press (not shown) through a chain 130 which operates around a sprocket 132 which is mounted on a shaft 134 of a gear box 136 (see FIGS. 1 and 2), the output of the gear box 136 being transmitted to the cam shaft 117 through a pair of spur gears 138, 140.

The cams 115, 116 respectively operate a pair of normally open switches 142, 144 (see FIG. 7), the switch 142 being incorporated in a grounded electrical circuit 146 which controls the solenoids 104, and the switch 144 being incorporated in a second grounded circuit 148 which controls the other solenoids 102.

A feeding cycle of the transfer mechanism, for the purposes of this description, may be deemed to begin when the rocker unit R is positioned in alignment with the magazine M, with the transfer heads H in retracted position. At such time, the transfer heads H occupy a position substantially the same as that shown in FIG. 2, but have not as yet picked up the strip S' which is shown in that figure.

The rotation of the cam shaft 117 now brings the high point 150 of the cam 116 into engagement with the plunger 152 of the switch 144 to momentarily close the switch contacts and momentarily energize the solenoids 102, thus moving sliding valve 108 to the left (as viewed in FIG. 8) and permitting compressed air from the manifold 113 to enter the bore 110 of each pneumatic cylinder 40 and press against the rearward side of the pistons 54, thus moving the piston rods 56 and the suction cups 66 and magnets 86 which are carried at their outer ends forwardly (to the right as viewed in FIGS. 2 and 7), to the position shown in dot and dash lines in FIG. 2, to bring the suction cups 66 into engagement with the innermost strip S' in the magazine M. However, due to the fact that the enlarged heads 96 of the rods 92 engage against the bosses 94 prior to the completion of the stroke of the piston 54, the forward motion of the magnets 86 is stopped before the forward motion of the suction cups 66, the difference in the length of the strokes of the piston 54 and the magnets 86 being taken up by the compression of the spring 88 as the magnet holder plate slides along the suction cup holder 84.

Just prior to, or during this forward stroke of the piston 54, a high portion 160 of a third rotary cam 162, also mounted on the cam shaft 117, closes a normally open switch 164 and energizes the solenoid 166 of the vacuum valve 80, thus opening the valve and bringing the suction cups 66 into communication with the source of vacuum. As a result, when the suction cups 66 engage against the innermost strip S' in the magazine M, they grip it securely.

Prior to the end of the forward stroke of the piston 54, the plunger 152 rides off the cam high 150. Shortly thereafter, at the completion of the forward stroke, a high spot 170 on the cam 115 engages the plunger 172 of the switch 142, thus closing the circuit 146 and energizing the solenoid 104 and causing the valve 108 to be shifted to the position of FIG. 8, wherein the bore 110 is brought into communication with the vent bore 109, and the compressed air is introduced into the pipe 111, and thus brought into communication with the forward side of the piston 54 to thus move the piston 54 through its return stroke and pull the innermost strip S' out of magazine M.

As seen in the dot and dash lines in FIG. 2, which show the position of the suction cups 66 and magnets 86 at the end of the forward stroke of the piston 54, the magnets 86 at such time are spaced from the magazine M a distance sufficient to prevent their magnetic fields from exerting any appreciable attraction on the strips S in the magazine M, and thus there is no danger of having two or more of the strips S from being pulled from the magazine M by the magnets 86.

During the first position of the return stroke of the pistons 54, the innermost strip S' is pulled into contact with the magnets 86, the gap between the suction cups 66 and the magnets 86 being eliminated due to the expansion of the springs 88. Thereafter, the strip is held by both the suction cups 66 and magnets 86, the springs 88 still being slightly compressed, until the plunger of the switch 164 rides off the high portion 160 to shut off the vacuum in the suction cups 66 and simultaneously vent the vacuum from the suction cups, at which time the spring 88 expands slightly to push the strip S' away from the suction cups 66 to the position shown in FIG. 7. The timing of this devacuumizing step is not critical and it can take place either during the later part of the return stroke of the piston 54, or the first part of the rocking cycle of the rocker head H, which will now be described.

Figure 3:
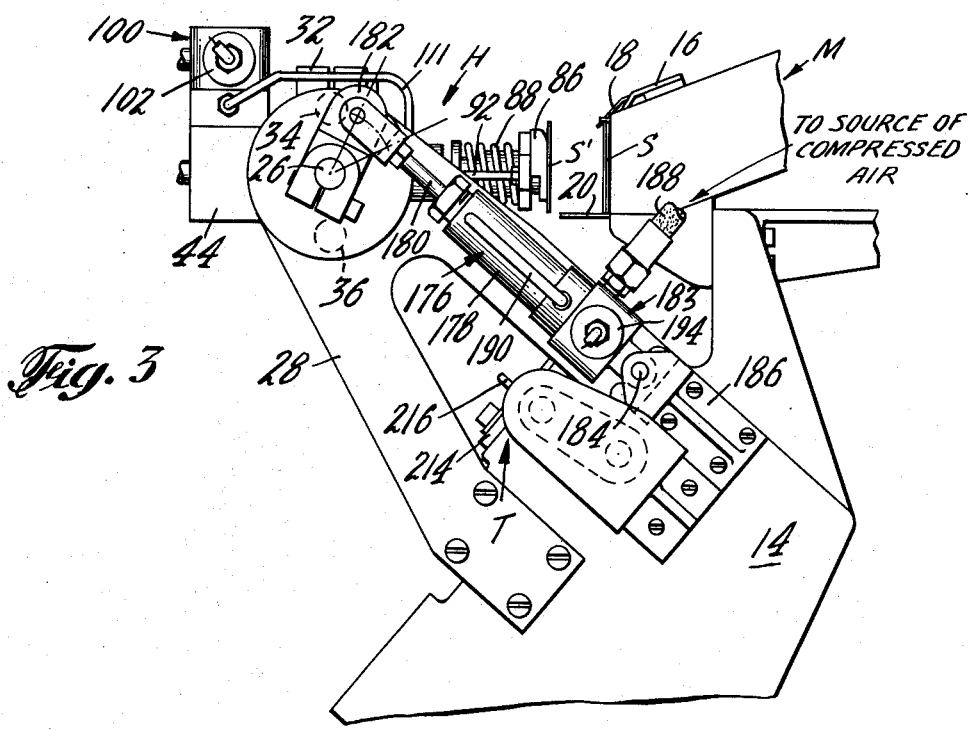
FIG. 3 is an end elevation taken substantially along the line 3—3 in FIG. 1.

After the piston 54 has reached the end of its return stroke and the strip S' has been pulled clear of the magazine support plate 20, the rocker head H is rocked by a pneumatic cylinder 176 (see FIGS. 1 and 3) to move the strip S' into alignment with the feed table T of the press feeding mechanism.

The air cylinder 176 is generally conventional in construction, being formed with a body 178 which contains the piston (not shown), a piston rod 180 projecting from one end of the body 178 and being secured to an arm 182 which is clamped to the outer end of the stub shaft 26 on which the rocker unit R is mounted. A control valve 183, generally similar in construction to the control valves 100 of the valves 40, is secured to the opposite end of the cylinder body 178 and is pivotally mounted on a pin 184 which is held in a bracket 186 fastened to the frame 14.

Compressed air is introduced into the valve 183 through a supply hose 188 and is selectively fed to the upper end of the cylinder through a pipe 190 and to the lower end of the cylinder through an internal bore (not shown), the flow of air being controlled by an internal valve slide (not shown) similar to the valve slide 108 of FIG. 8. The position of the valve slide is controlled by a pair of solenoids 192, 194 (see FIGS. 1 and 7) which are wired into grounded circuits 196, 198 respectively.

When the pistons 54 reaches the end of their return stroke, a high spot 200 of a fourth rotary cam 202, which is secured to the cam shaft 117, closes the contacts of a switch 204 which is wired into the circuit 198, thus energizing the solenoid 194. As a result, compressed air is introduced into the pipe 190 with the result that the piston in the cylinder 176 is moved through its down stroke, thereby rocking the arm 182 and consequently the rocker unit R from the position of FIG. 3, where it is in alignment with the magazine M, to the position of FIG. 6, where it is in alignment with the feed table T.

As soon as the rocker unit R reaches this position, a second high portion 210 of the cam 116 closes the contacts of the switch 144, thus causing the pistons 54 to again move through a forward stroke, thus moving the strip S' toward the feed table T. During the last portion of this stroke, the expanded heads 96 of the rods 92 once again bottom on the bosses 94, thereby halting the forward movement of the magnets 86. However, the suction cups 66, which are now not vacuumized, continue their forward movement and strip the strip S' from the magnets and continue its movement toward the feed table T.

Figure 4:
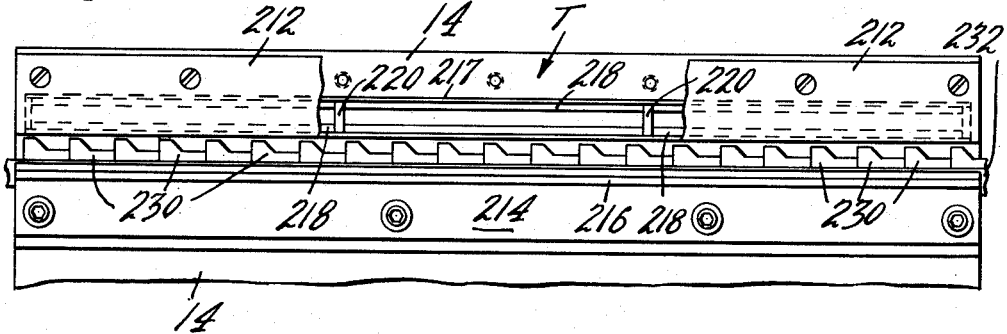
FIG. 4 is a section taken substantially along the line 4—4 in FIG. 2 and looking onto the surface of the magnetic feed table along which the strips are fed into the die station of the press, parts being broken away.
Figure 5:
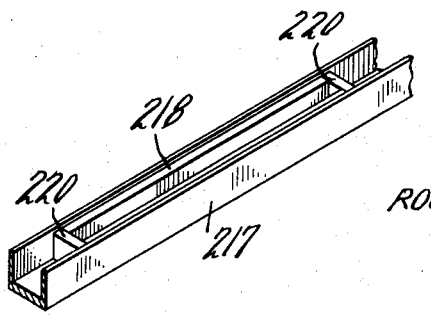
FIG. 5 is perspective view of a portion of a magnetic insert for holding the strips against the surface of the feed table.

The feed table T comprises a pair of spaced, elongated, non-magnetic plates 212, 214 which are secured to the frame 14, the lower plate 214 being formed with an integral guide rail 216 (see FIGS. 1, 2 and 4). A channel bar 217 is set into a groove formed in the frame 14, and forms a holder for a plurality of strong, elongated magnets 218 which extend for the full length of the plates 212, 214 and are separated from each other by non-magnetic spacers 220.

As the strip S' approaches the feed table T, it is attracted by the magnets 218 and pulled against the plates 212, 214, with its lower edge in contact with the guide rail 216. As seen in FIG. 6, the forward movement of the suction cups 66 stops somewhat short of the feed table T, so that a slight gap is present between the strip S', as it is held against the table T by the magnets 218, and the suction cups 66. Consequently, the strip S' is free to immediately start its movement along the table T into the die D which forms it into a plurality of individual articles.

The strip is propelled along the feed table T by a number of reciprocating feed fingers 230 which are mounted in and secured to a feed bar 232 which is driven from the main drive of the machine, in timed relationship with the rotation of the cam shaft 117, through a drive which includes drive chain 234, a pair of bevel gears 236, 238, a short shaft 240, and an arm 242 which is mounted on an eccentric 244 which is mounted on the end of the shaft 240, the arm 242 being connected to the feed bar 232 through a link 246.

The details of construction of the feed fingers 230 form no part of the instant invention, it being sufficient to say that they are pressed downwardly by the strip on the backward stroke of the feed bar 232 and rise up successively behind the strip S' to feed it intermittently along the feed table T in the usual manner.

After the strip S' has been deposited on the feed table T, a second high portion 250 on the cam 115 closes the switch 142, thus energizing the solenoid 104 and initiating a return stroke of the piston 54 and causing the suction cup 66 and magnets to be moved to their rearward position.

Immediately thereafter, a high portion 252 of a fifth rotary cam 254, also secured to the cam shaft 117, closes the contacts of a switch 256 and thus energizes the solenoid 192 of the rocker cylinder 176 and causes the piston of that cylinder to move upwardly, thereby rocking the rocker unit R upwardly to move it into alignment with the magazine M.

At the end of this stroke, the vacuum valve 80 is opened to vacuumize the suction cups 66 and the high spot 150 of the cam 116 closes the switch 144 to initiate the next transfer cycle.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A mechanism for transferring blanks from a magazine to a feed table, comprising a pivotally mounted rocker unit, means for swinging said rocker unit from a first position where it is in alignment with said magazine to a second position where it is in alignment with said feed table, a suction cup carried by said rocker unit, means for vacuumizing said suction cup, magnetic means carried by said rocker unit adjacent said suction cup, means for reciprocating said vacuumized suction cup at said first position to bring it into engagement with a said blank in said magazine and to withdraw said blank from said magazine and to move it into engagement with said magnetic means, means for thereafter devacuumizing said suction cup and for reciprocating said devacuumized cup for stripping said blank from said magnetic means after said rocker unit has been swung to said second position to deposit said blank on said feed table.

2. A mechanism for transferring blanks from a magazine to a feed table, comprising a pivotally mounted rocker unit, means for oscillating said rocker unit between a first position where it is in alignment with said magazine and a second position where it is in alignment with said feed table, a pneumatic cylinder carried by said rocker unit, said cylinder including a piston and a piston rod, a suction cup carried on the forward end of said piston rod, a magnet carried on said rocker unit adjacent said suction cup, means for actuating said pneumatic cylinder through a forward and a return stroke at both said first and said second positions to move said suction cup relative to said magnet, and means for vacuumizing said suction cup during its movement at said first position whereby it pulls a blank from said magazine and delivers it to said magnet while said rocker unit is at said first position, and means for devacuumizing said suction cup during its movement at said second position whereby it strips said blank from said magnet and delivers it to said feed table while said rocker unit is at said second position.

3. The mechanism of claim 2 wherein said magnet is carried on the forward end of said piston rod adjacent said suction cup, and wherein stop means are provided to limit the forward movement of said magnet to provide relative axial movement between said suction cup and said magnet.

4. The mechanism of claim 3 wherein the means for oscillating said rocker unit comprises a pneumatic cylinder.

5. The mechanism of claim 3 wherein said rocker unit carries a plurality of suction cups, and wherein at least one magnet is carried adjacent each suction cup.

6. A gripper head for pulling a blank from a magazine and for delivering it to a place of deposit, comprising a pneumatic cylinder unit which is formed of a cylinder body, a piston, and a hollow piston rod extending from said piston in both directions, a suction cup mounted on the forward end of said piston rod, said piston rod at its rearward end being connected to a source of vacuum which is brought into communication with said suction cup through said hollow piston rod, a magnetic gripper member mounted on the forward end of said piston rod, means for moving said piston rod and said suction cup and said magnetic gripper member through a forward and a return stroke, and stop means for stopping the forward movement of said magnetic gripper member prior to the completion of the forward stroke of said piston rod and said suction cup whereby a relative motion is effected between said suction cup and said magnetic gripper member thereby to prevent the latter from exerting undesirable magnetic influence on said blanks in said magazine while said suction cup picks up a single blank therefrom.

7. The mechanism of claim 6 wherein said magnetic gripper member comprises a holder plate which is mounted adjacent said suction cup and which carries a plurality of magnets which straddle said suction cup.

8. A mechanism for transferring blanks from a magazine to a feed table, comprising a rocker unit, means for swinging said unit between said magazine and said feed table, suction and stripping means carried by said rocker unit for picking up said blanks individually from said magazine and delivering them to said table, magnetic means carried by said rocker unit for holding temporarily each of said blanks picked up by said suction means, means for drawing a partial vacuum in said suction means while the latter effects said picking up and temporary transfer of a blank to said magnetic means and for cutting off the vacuum in said suction means while the latter is utilized for stripping said blanks from said magnetic means and delivering them onto said feed table.

References Cited in the file of this patent
UNITED STATES PATENTS

| | | |
|---|---|---|
| 1,089,274 | Sazenhofen | Mar. 3, 1914 |
| 1,496,726 | Myhrum | June 3, 1924 |
| 2,011,793 | Bond | Aug. 20, 1935 |
| 2,442,250 | Spain | May 25, 1948 |
| 2,615,746 | Fischer | Oct. 28, 1952 |
| 2,792,810 | Maconeghy | May 21, 1957 |